D. S. CURTISS.
Fertilizer-Distributers.

No. 153,670. Patented Aug. 4, 1874.

WITNESSES
Wm E Chaffee
Thos Jewell

INVENTOR
Daniel S. Curtiss
by Stansbury & Munn
his — Attorneys.

By

UNITED STATES PATENT OFFICE.

DANIEL S. CURTISS, OF WASHINGTON, DISTRICT OF COLUMBIA.

IMPROVEMENT IN FERTILIZER-DISTRIBUTERS.

Specification forming part of Letters Patent No. 153,670, dated August 4, 1874; application filed June 3, 1874.

*To all whom it may concern:*

Be it known that I, DANIEL S. CURTISS, of the city of Washington, District of Columbia, have invented certain Improvements in Machines for Distributing Manure and other substances; and I do hereby declare the following to be a full and correct description of the same, reference being had to the accompanying drawings, in which—

Figure 1:
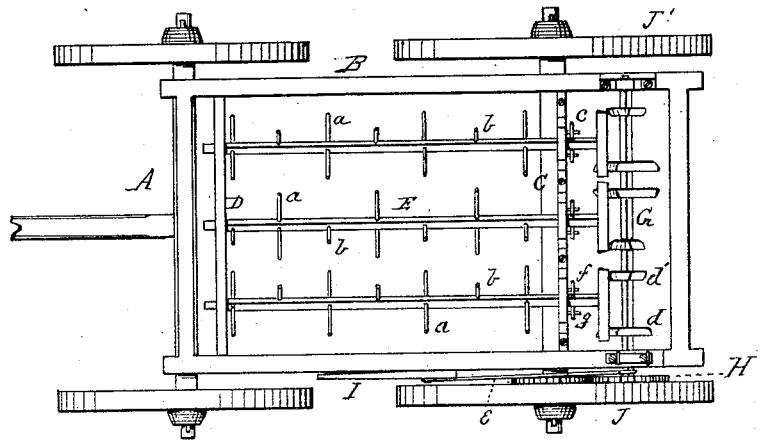
Figure 2:
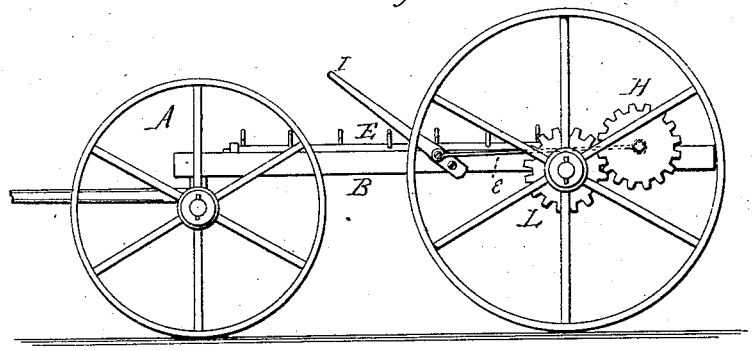
Figure 3:
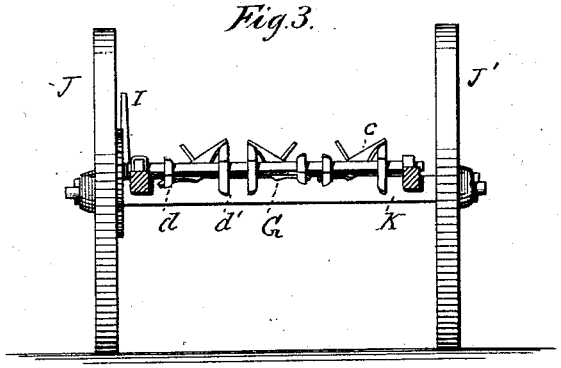

Figure 1 is a top-plan view, Fig. 2 a side view, and Fig. 3 an end view.

The object of my invention is to provide a manure or dirt distributer that may be attached to the end or to the detached forward wheels of a wagon. It consists of a pair of wheels having mounted thereon a frame with a series of longitudinal shafts provided with fingers or forks extending at right angles to their length, and arranged to be rocked automatically by means of the wheels and certain connecting mechanical contrivances.

In the drawings, A are the detached forward wheels of a wagon, to the axle of which the distributer is attached, as shown in Figs. 1 and 2.

In constructing the distributer I make a strong frame, B, with cross-pieces C and D therein, the former being a short distance from the front, and the latter about one-fourth of the length of the frame from its rear end. In these cross-pieces are mounted, longitudinally, a series of shafts, E, each having a series of fingers or forks, $a$ and $b$, arranged at right angles to the length of the shafts. The fingers $a$ extend in opposite directions from the sides of the shaft, and the fingers or forks $b$ vertically from their upper sides. They are arranged alternately on each shaft, and so that the former on one shaft may be in nearly the same vertical plane with the latter on the adjoining shaft, as shown in Fig. 1. Each of the shafts E projects through and beyond the cross-piece C, and has a cam, $c$, on its end with diagonally-beveled ends, as shown in Fig. 1, and shaped as shown in Fig. 3. Opposite these ends, and between the cross-piece C and the end of the frame, a shaft, G, is mounted, provided with a series of cams, $d$ and $d'$, and a pinion or gear wheel, H, on its outer end, and so arranged that the end to which the gear-wheel is attached may, with its journals, be moved backward and forward by a lever, I, and connecting-rod $e$, as shown in Figs. 1 and 2. The cams $d$ and $d'$ are also made with their ends beveled diagonally, and arranged as shown in Figs. 1 and 3, so that, as the shaft G revolves, the cams $d$ will engage with one end of the cams $c$, and cause the shafts E to make a part of a revolution in one direction, and be disengaged, when the cams $d'$ will engage with the opposite ends of the cams $c$, and cause the shafts E to make part of a revolution in the opposite direction, then be disengaged, thus causing them to rock. In order to prevent any complete revolution of the shafts short arms $f$ extend from each side of these shafts in the rear of the cross-piece C, so as to engage with check-pins $g$ in this cross-piece, as shown in Fig. 1.

The frame B is mounted on wheels J J', and rigidly attached to their axle K, so that its cross-piece C will be directly over the axle. To this axle, and on the same side with the gear-wheel H, a gear-wheel, L, is rigidly attached to the wheel J, as shown in Fig. 2, so that, by means of the lever I, the wheel H may be thrown in and out of gear with it as desired.

As already stated, the distributer thus constructed may be connected to the rear end or to the detached forward wheels of a wagon. It can then be loaded with manure, or other substance that it is desired to distribute over the ground, the shafts, with their fingers, supporting it. When desired, it is obvious that side-boards may be used.

To distribute the load, as will be seen, it is only necessary to pull the end of the lever I forward, and connect the gear-wheels L and H; then, as the whole is drawn forward, a rocking motion is given to the shafts E, by means of the cams $d$ and $d'$ operating the cams $c$, and the manure, or other substance, is shaken up by the fingers $a$ and $b'$, and scattered over the ground. The operation may be arrested at any time by simply disconnecting the gear-wheels.

Having thus described my invention, what I claim is—

1. A distributer for manure, or other substances, consisting of a frame, B, with a series of shafts, E, provided with a series of fingers or forks, *a* and *b*, and cams *c*, and a shaft, G, provided with cams *d* and *d'*, and gear-wheel H, mounted on wheels provided with a gear-wheel, L, all constructed and combined substantially as and for the purpose set forth.

2. In combination with the rocking shafts E, the arms *f* and check-pins *g*, as and for the purpose set forth.

3. In a manure-distributer, the combination of the cams *c*, *d*, and *d'* with the toothed shafts E and shaft G, as described, for giving a rocking motion to the shafts E, as set forth.

The above specification of my said invention signed and witnessed at Washington, D. C., this 29th day of May, A. D. 1874.

DANIEL S. CURTISS.

Witnesses:
  W. P. BELL,
  H. B. MUNN.